Oct. 28, 1958 A. V. BEDFORD 2,858,362

COLOR TELEVISION SIGNAL GENERATING APPARATUS

Filed March 12, 1952

INVENTOR
ALDA VERNON BEDFORD
BY [signature]
ATTORNEY 2,858,362

COLOR TELEVISION SIGNAL GENERATING APPARATUS

Alda V. Bedford, Princeton, N. J.

Application March 12, 1952, Serial No. 276,076

5 Claims. (Cl. 178—5.4)

This invention relates to apparatus for generating color signals and brightness signals useful in certain types of color television transmission systems.

In previous arrangements, the signals representing each different selected component color have been derived by a separate television pickup tube. These color signals were then passed through separate gamma correction circuits so as to compensate for the non-linearity of the kinescopes used for reproducing the image. In one type of color television system, these corrected color signals were added together to form a brightness signal that was essentially the same as the brightness signal used in standard black and white television systems. The low frequency portion of the corrected color signals were also used to control the phase and amplitude of a subcarrier having a frequency lying within the band of frequencies used for the brightness signals. The color subcarrier and the brightness signal were combined before transmission.

Black and white television receivers reproduced the brightness variations represented by the brightness component of the signal but the subcarrier was such that the responses of the black and white receivers to the color subcarrier was cancelled. In color receivers the original color signals are employed to produce an image in full color.

However, it was determined that the different color signals were not always in registry or in other words that they did not always represent the intensity of the same point in the image at any given instant. This affected the brightness in both the standard black and white receiver and the color receivers. In addition it caused some change in the color reproduced by the color receiver. The misregistration of the signals was generally not severe and therefore was practically unnoticeable in large areas where neither the brightness nor the color changed. This is understandable because even if the different color signals represented the intensities of their respective colors at different points in these areas the signals would be the same. However, if the colors or brightness at the different points represented by the different signals are not the same then incorrect results are obtained in the black and white images formed by black and white receivers as well as in the colored images formed in the color receiver. This situation normally occurred only when the image contained changes in color or brightness that took place between the points represented by the different color signals. Such changes would normally take place at the edges of objects.

It has been amply demonstrated that the eye's response is more acute to sudden changes in brightness than to sudden changes in color. Therefore it was proposed that all misregistration in brightness be removed by employing a single camera for deriving a brightness signal. If three selected color components were to be used in the system, optical filters were placed between the scene being televised and the brightness camera so that the brightness signal would be the same as the sum of the intensities of the different selected component colors. Two additional cameras were employed, one having the same response to different intensities of a first selected component color as the brightness camera, and the other having the same response to the different intensities of a second selected component color as the brightness camera. The signal outputs of the two color cameras were then subtracted from the signal output of the brightness camera so as to derive a signal representative of the third selected component color. The different color signals were employed to control the color subcarrier and the subcarrier was then combined with the brightness signal. Thus the brightness signal was always correct even if the color signals were slightly misregistered. Such an arrangement can be found in the U. S. patent application bearing Serial No. 171,407, filed on June 30, 1950, in the name of Kell, now U. S. Patent 2,750,439, granted June 12, 1956.

However, kinescopes used in the receivers have a marked non-linear characteristic and it is therefore customary to effectively cancel the effects of this non-linearity by predistorting the signals. Such predistortion is normally termed gamma control. In the camera arrangement just described the gamma control was applied to the output of the brightness camera and to each of the two color cameras separately. The output of the brightness camera is the sum of the light of the selected component colors with which the color receiver is to form the color image. In the color receiver the brightness signal is combined with the color signals in such manner as to recover the original intensities of each color. If, however, the brightness signal is derived directly from the brightness camera and is applied to a gamma control device, the amplitude of the brightness signal after being gamma corrected depends on the sum of the intensities of each component color. Therefore when the corrected brightness signal is combined with the color signal to determine the intensity of that particular color the result depends on the original intensities of the other colors that were combined to form the brightness signal.

In accordance with this invention the corrected brightness signal is formed by deriving signals representing the intensities of the selected component colors and passing each of these signals through a gamma correction device and combining these signals in desired proportion to form a corrected brightness signal. A corrected brightness signal formed in this way has an amplitude that is dependent only on the sum of the gamma corrected color signals. Therefore, when it is combined in the receiver with gamma corrected color signals the intensities of the original component colors can be recovered.

It is therefore an object of the present invention to provide an improved means for correcting the gamma of the color signals and the brightness signal supplied by this general type of apparatus.

Briefly this objective may be obtained in the following manner. Linear cameras are employed to derive two color signals and a brightness signal and the two color signals are subtracted from the brightness signal so as to derive a third color signal. Gamma correction is applied to each of the selected color signals and they are combined so as to form a gamma corrected brightness signal. It is this corrected brightness signal that is bypassed around the sampler or modulator at the transmitter.

It is a further object of the invention to provide an improved means for producing a brightness signal having the selected color components represented in a desired ratio.

This latter objective may be achieved by combining the outputs of the gamma correctors to which the selected component color signals are applied after they have passed through channels having different gains.

The manner in which the above objectives may be attained will be more completely understood after a detailed consideration of the drawings in which.

Figure 1:
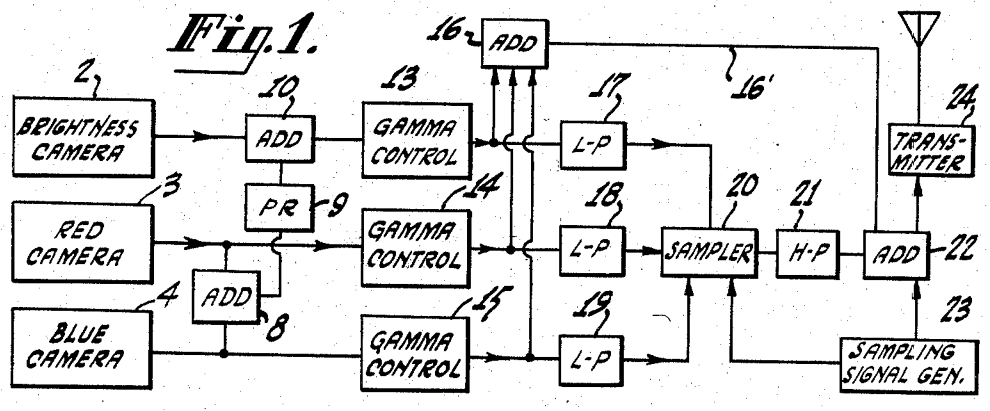
Figure 1 illustrates an arrangement whereby the brightness signal is derived from all three selected component colors.

In the arrangement of Figure 1 it is assumed that the brightness camera 2, the red camera 3 and the blue camera 4 are linear; that is to say that the signal amplitudes are proportional to the intensity of the lights from the corresponding points of the scene falling on the cameras. The outputs of the red camera 3 and the blue camera 4 are combined in an adder 8 and after passing through a polarity reverser 9 are applied to an adder 10 so as to be subtracted from the brightness signal also supplied to the adder 10 from the brightness camera 2. Since the brightness signal supplied by the camera 2 is produced in response to the green, red and blue selected component colors, the subtraction of the red and blue signals from the brightness signal in the adder 10 produces a green signal at the output of the adder 10. The green signals are then applied to a gamma control device 13, the red video signals are applied to a gamma control device 14 and the blue signals are applied to a gamma control device 15.

Figure 3:
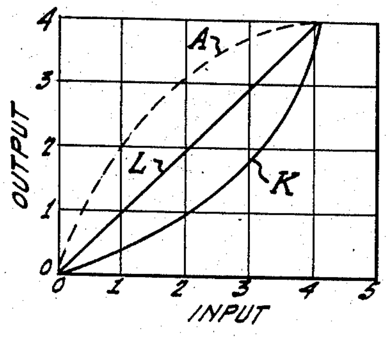
Figure 3 illustrates by graphical representation the manner in which the non-linearity of the system may be linearized by the use of gamma correction devices.

It will be noted that the characteristics of the gamma control devices may differ from each other. This is done so that the gamma control device can compensate for different nonlinearities in the different color channels. For example, the means producing red light in the final image may have different nonlinearity characteristics from the means that produces the blue light and these different nonlinearities are corrected by gamma control devices 14 and 15. This is illustrated in Figure 3 where the curve "K" illustrates the type of nonlinearity generally encountered in the kinescopes employed to reproduce the various color signals. Different non-linearities may be compensated for by inserting in the channel carrying signals to the kinescope a gamma control device having a complementary characteristic "A." Thus if the nonlinearity of the different color channels is different, the compensation must be produced by gamma devices also having different characteristics. It is believed that the circuits for introducing the desired nonlinear characteristics of the type required by the gamma control devices 13, 14 and 15 are well known in the art. Suitable devices are illustrated in the U. S. Patent No. 2,326,907, filed November 27, 1940, in the name of K. R. Wendt.

After the selected color signals have been nonlinearized by passing through the respective gamma control devices 13, 14 and 15, they are coupled to an adder 16 so as to form a brightness signal on a lead 16' which is connected to the output of the adder. As will be explained in more detail in connection with Figure 4, the adder may be adapted to combine these color signals in different ratios so that the brightness signal appearing at the lead 16' may correspond to a desired apparent brightness even if the sensitivities of the red, and blue color cameras and the brightness cameras do not have the proper ratios. For example, the brightness camera 2 might be more sensitive to green light so that the green signal appearing at the output of the adder 10 might be much larger with respect to the red signals supplied by camera 3 and the blue supplied by the camera 4 than is desired. At the input of the adder 16, therefore, the green signal will be large relative to the red and blue signals.

Figure 4:
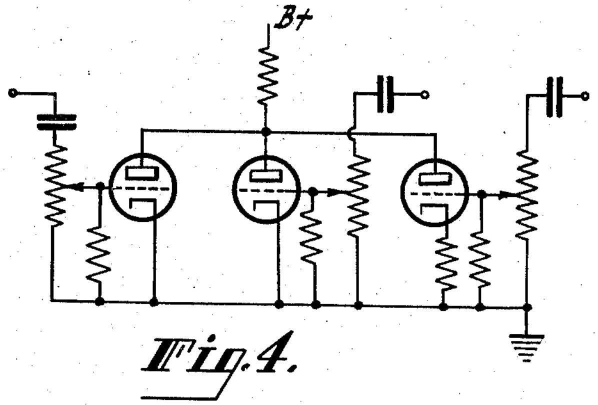
Figure 4 illustrates a type of adder that may be employed to produce a brightness signal in which the selected component colors are represented in desired ratio.

The adder 16 may be of the type illustrated in Figure 4 wherein the plates of three different amplifiers are connected to B+ via a common load impedance. Each of the outputs of the gamma control devices 13, 14 and 15 are coupled to a different one of the amplifiers via a condenser and a potentiometer as shown. The potentiometer may therefore be adjusted so as to select any given proportion of the signals applied to them.

The following description relates to apparatus with which the invention cooperates in a satisfactory manner. The green signals provided at the output of the gamma correction device 13 are passed to a sampler or color modulator 20 by a low pass filter 17. The red video signals supplied by the gamma correction device 14 are applied to the sampler 20 via a low pass filter 18 and the blue video signals supplied by the gamma device 15 are applied to the sampler 20 via low pass filter 19. As may be better understood from a reference to an article on page 1264 of "Proceedings of I. R. E." volume 39, published in October 1951, the sampler is also supplied with an output of a sampling generator 23. The low frequency color signals modulate the emplitude of different phases of the output of the sampling generator 23 and are combined so as to produce a color subcarrier having a phase that indicates hue and an amplitude that is representative of saturation or chroma. As the frequency supplied by the sampling generator is generally above the upper limit of the low pass filters 17, 18 and 19 the band or frequency produced by the modulation of this frequency in the sampler 20 produces side bands in the upper portion of the video spectrum. Portions of these side bands are selected by the high pass filters 21 and applied to the adder 22 so that it is combined with the brightness signal on the lead 16'. This signal is then supplied to any suitable transmission means such as transmitter 24.

Figure 2:
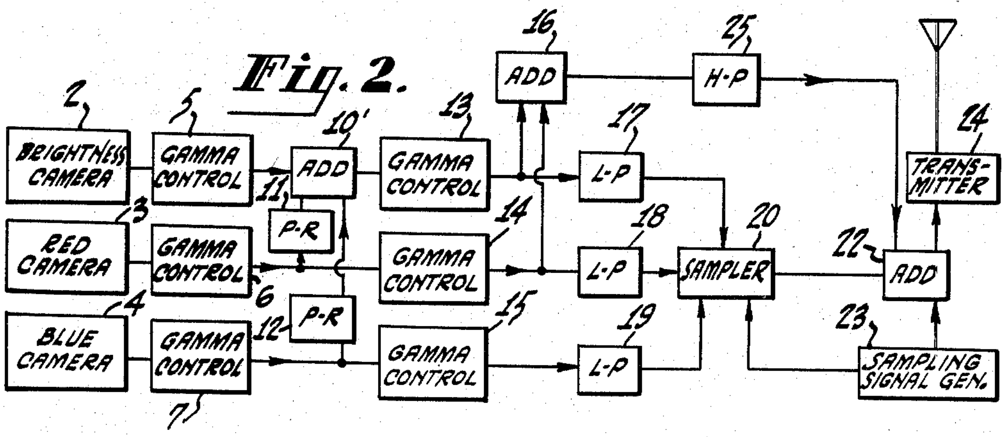
Figure 2 illustrates apparatus embodying an invention wherein the brightness signal is comprised of only two of the selected component colors.

The arrangement of Figure 2 is similar to that of Figure 1 and corresponding components are indicated by the same numerals. In the arrangement of Figure 1 it was assumed that the cameras had linear characteristics. However, as is well known to those skilled in the art, such is not always the case. Therefore these nonlinear characteristics are effectively counterbalanced by inserting gamma correction devices 5, 6 and 7 in the output circuits of the cameras 2, 3 and 4 respectively. In the arrangement of Figure 1 the red and blue signals are added in an adder 8 and then reversed in polarity by a polarity reverser 9 before being subtractively combined with the brightness signal supplied by the camera 2 and adder 10. In the arrangement of Figure 2 however, the red video signals supplied by the gamma correction device 6 are applied to the adder 10 via a polarity reverser 11 and the blue video signals at the output of the gamma correction device 6 are applied to the adder 10 via a polarity reverser 12. A further difference between the arrangement of Figure 2 and that of Figure 1 is that only the outputs of the gamma correction devices 13 and 14 are applied to the adder 16 whereas the output of the gamma correction device 15 is not. The high frequencies appearing at the output of the adder 16 are selected by a high pass filter 25 and applied to the adder 22. A still further distinction between the structures of Figures 1 and 2 is the type of brightness signal produced. In Figure 1 the final brightness signal is comprised of low and high frequencies of all colors whereas in Figure 2 the final brightness signal is comprised of only the high frequencies of some of the colors.

What is claimed is:

1. Apparatus for deriving brightness signals and color signals with non-linearity suitable to compensate for nonlinearities in a system in which such signals are utilized, said apparatus comprising in combination two linear color cameras and a linear brightness camera, means coupled to said cameras for subtracting the sum of the outputs of said color cameras from the output of said brightness camera so as to derive a signal corresponding to a third color, a first gamma control device coupled to the output of said subtracting means, a second gamma control device coupled to the output of one of said color cameras, a third gamma control device coupled to the output of the other of said color cameras, each of such gamma control devices having an output terminal, and an adder having a plurality of inputs and an output, each of said inputs being coupled to the output terminal of one of said gamma control devices so as to form a brightness signal at its output.

2. Apparatus for deriving a brightness signal representing the selected component colors of a scene in desired ratios and color signals in a system having certain nonlinearity, said apparatus comprising in combination a linear brightness camera having an output terminal, the signals provided by said camera having predetermined relative amplitudes in response to equal amounts of light of the selected component colors, a first color camera and a second color camera, each of said color cameras having a predetermined response to a given amount of light of their respective selected component colors and each of said color cameras having an output terminal, means for equalizing the responses of said color cameras and the response of said brightness camera to the corresponding color, means coupled to said camera output terminals for subtracting the signals provided by said color cameras from the signals provided by said brightness camera so as to provide a signal corresponding to a third selected component color, a separate gamma control device coupled to said subtracting means and to each of said color cameras, an adder having three inputs and an output, each of said inputs being coupled to a different one of said gamma control devices, said adder comprising means for combining the signals applied to its different inputs in a predetermined ratio so as to provide a brightness signal.

3. In a color television system wherein the different selected component colors are reproduced with predetermined gamma characteristics, apparatus as described in claim 2 wherein the gamma characteristics of said gamma control devices are respectively substantially complementary to the gamma characteristics of said system for such different colors of the system.

4. Apparatus for deriving brightness signals and color signals in such manner as to compensate for at least some of the non-linearities in a system in which such signals are utilized, said apparatus comprising in combination means for deriving a brightness signal, a plurality of means for deriving color signals, means coupled to said first- and second-named means for subtracting said color signals from said brightness signal so as to derive a different color signal, means coupled to at least one of such color signal deriving means for controlling the gamma of at least one of said color signals, and means operatively connected to said gamma controlling means and to the other ones of said color signal deriving means for combining the gamma controlled color signals and certain of the other color signals to form a brightness signal.

5. Apparatus as described in claim 4 wherein said combining means comprises means for combining said signals in predetermined ratios.

References Cited in the file of this patent

UNITED STATES PATENTS

| | | |
|---|---|---|
| 2,552,386 | Sziklai | May 8, 1951 |
| 2,567,040 | Sziklai | Sept. 4, 1951 |
| 2,657,255 | Wintringham | Oct. 27, 1953 |
| 2,750,439 | Kell | June 12, 1956 |

OTHER REFERENCES

"Principles of NTSC Compatible Color Television," Electronics, February 1952, pages 88–97.

UNITED STATES PATENT OFFICE

CERTIFICATE OF CORRECTION

Patent No. 2,858,362

October 28, 1958

Alda V. Bedford

It is hereby certified that error appears in the above numbered patent requiring correction and that the said Letters Patent should read as corrected below.

In the grant, lines 1 to 3, for "Alda V. Bedford, of Princeton, New Jersey," read -- Alda V. Bedford, of Princeton, New Jersey, assignor to Radio Corporation of America, a corporation of Delaware, --; line 12, for "Alda V. Bedford, his heirs" read -- Radio Corporation of America, its successors --; in the heading to the printed specification, line 4, for "Alda V. Bedford, Princeton, N. J." read -- Alda V. Bedford, Princeton, N. J., assignor to Radio Corporation of America, a corporation of Delaware --.

Signed and sealed this 27th day of January 1959.

(SEAL)

Attest:

KARL H. AXLINE

Attesting Officer

ROBERT C. WATSON

Commissioner of Patents